(12) United States Patent
Choi et al.

(10) Patent No.: US 7,764,744 B2
(45) Date of Patent: Jul. 27, 2010

(54) APPARATUS AND METHOD FOR EXTENDING NUMBER OF ANTENNAS IN A WIRELESS COMMUNICATION SYSTEM USING MULTIPLE ANTENNAS

(75) Inventors: Soong-Yoon Choi, Suwon-si (KR); Gun-Chul Hwang, Gwangju (KR); Chan-Byoung Chae, Seoul (KR); Seung-Hoon Nam, Seoul (KR)

(73) Assignee: Samsung Electronics Co., Ltd (KR)

( * ) Notice: Subject to any disclaimer, the term of this patent is extended or adjusted under 35 U.S.C. 154(b) by 917 days.

(21) Appl. No.: 11/523,278

(22) Filed: Sep. 18, 2006

(65) Prior Publication Data

US 2007/0064830 A1 Mar. 22, 2007

(30) Foreign Application Priority Data

Sep. 16, 2005 (KR) ............... 10-2005-0086872

(51) Int. Cl.
  H04B 7/02 (2006.01)
  H04L 27/28 (2006.01)
  H04J 7/02 (2006.01)
  H04J 11/00 (2006.01)
  H04W 4/00 (2009.01)
(52) U.S. Cl. ............ 375/267; 375/260; 370/203; 370/208; 370/210; 370/332; 370/334
(58) Field of Classification Search ........... 375/260, 375/267, 299; 370/208, 328, 203, 210, 332, 370/334
See application file for complete search history.

(56) References Cited

U.S. PATENT DOCUMENTS

| 7,139,328 | B2 * | 11/2006 | Thomas et al. ............ 375/299 |
| 2003/0125040 | A1 | 7/2003 | Walton et al. |
| 2004/0082356 | A1 | 4/2004 | Walton et al. |
| 2004/0252779 | A1 * | 12/2004 | Rouquette et al. ........ 375/267 |
| 2005/0190849 | A1 * | 9/2005 | McNamara ............... 375/267 |
| 2005/0249304 | A1 * | 11/2005 | Takano et al. ............. 375/267 |
| 2006/0034165 | A1 * | 2/2006 | Levy ........................ 370/208 |
| 2006/0126752 | A1 * | 6/2006 | Hansen et al. ............. 375/267 |

FOREIGN PATENT DOCUMENTS

KR 1020050102332 10/2005
WO WO 2005/107098 11/2005

* cited by examiner

*Primary Examiner*—Mohammad H Ghayour
*Assistant Examiner*—Eboni Giles
(74) *Attorney, Agent, or Firm*—The Farrell Law Firm, LLP (57) ABSTRACT

An apparatus and method for simultaneously providing service to users each having a different number of antennas in a multiple-antenna wireless communication system are provided. The communication method discloses a BS in a wireless communication system that services a first multiple antenna mode using X transmit antennas and a second multiple antenna mode using Y transmit antennas such that (Y>X), the BS determines an MS to be serviced in the second multiple antenna mode and receives a sounding signal from the MS. The BS estimates an uplink channel using the received sounding signal and acquires downlink channel values using estimated uplink channel values. Then the BS services the MS in the second multiple antenna mode using the downlink channel values.

30 Claims, 10 Drawing Sheets

APPARATUS AND METHOD FOR EXTENDING NUMBER OF ANTENNAS IN A WIRELESS COMMUNICATION SYSTEM USING MULTIPLE ANTENNAS

PRIORITY

This application claims priority under 35 U.S.C. §119 to an application entitled "Apparatus And Method For Extending Number Of Antennas In A Wireless Communication System Using Multiple Antennas" filed in the Korean Intellectual Property Office on Sep. 16, 2005 and assigned Serial No. 2005-86872, the contents of which are incorporated herein by reference.

BACKGROUND OF THE INVENTION

1. Field of the Invention

The present invention relates generally to an apparatus and method for expanding the number of antennas in a Multiple Input Multiple Output (MIMO) wireless communication system, and in particular, to an apparatus and method for simultaneously providing a service to users using different numbers of antennas in a Multiple Input Multiple Output-Orthogonal Frequency Division Multiplexing (MIMO-OFDM) communication system.

2. Description of the Related Art

The basic issue for communications is how efficiently and reliably to transmit data on channels. Along with the demand for a high-speed communication system capable of processing and transmitting video and wireless data in addition to the traditional voice service, it is essential for future-generation multimedia mobile communication systems now under active study to increase system efficiency using an appropriate channel coding scheme.

Generally, in the wireless channel environment of a mobile communication system, unlike that of a wired channel environment, a transmission signal inevitably experiences loss due to several factors such as multipath interference, shadowing, wave attenuation, time-varying noise, and fading.

The resulting information loss causes severe distortion to the actual transmission signal, degrading the entire system performance. In order to reduce the information loss, depending on the characteristics of the channels many error control techniques are usually adopted to thereby increase system reliability. The basic one use is an error correction code.

In the wireless communication system, multipath fading is relieved by diversity techniques. These techniques are classified into time diversity, frequency diversity, and antenna diversity techniques or schemes.

The antenna diversity scheme uses multiple antennas. This scheme is further branched into receive (Rx) antenna diversity using a plurality of Rx antennas, Tx antenna diversity using a plurality of Tx antennas, and MIMO using a plurality of Tx antennas and a plurality of Rx antennas.

MIMO is a special case of Space-Time Coding (STC) that extends coding in the time domain to the space domain by transmitting a signal encoded in a predetermined coding method through a plurality of Tx antennas, with the aim to achieve a lower error rate.

Figure 1:
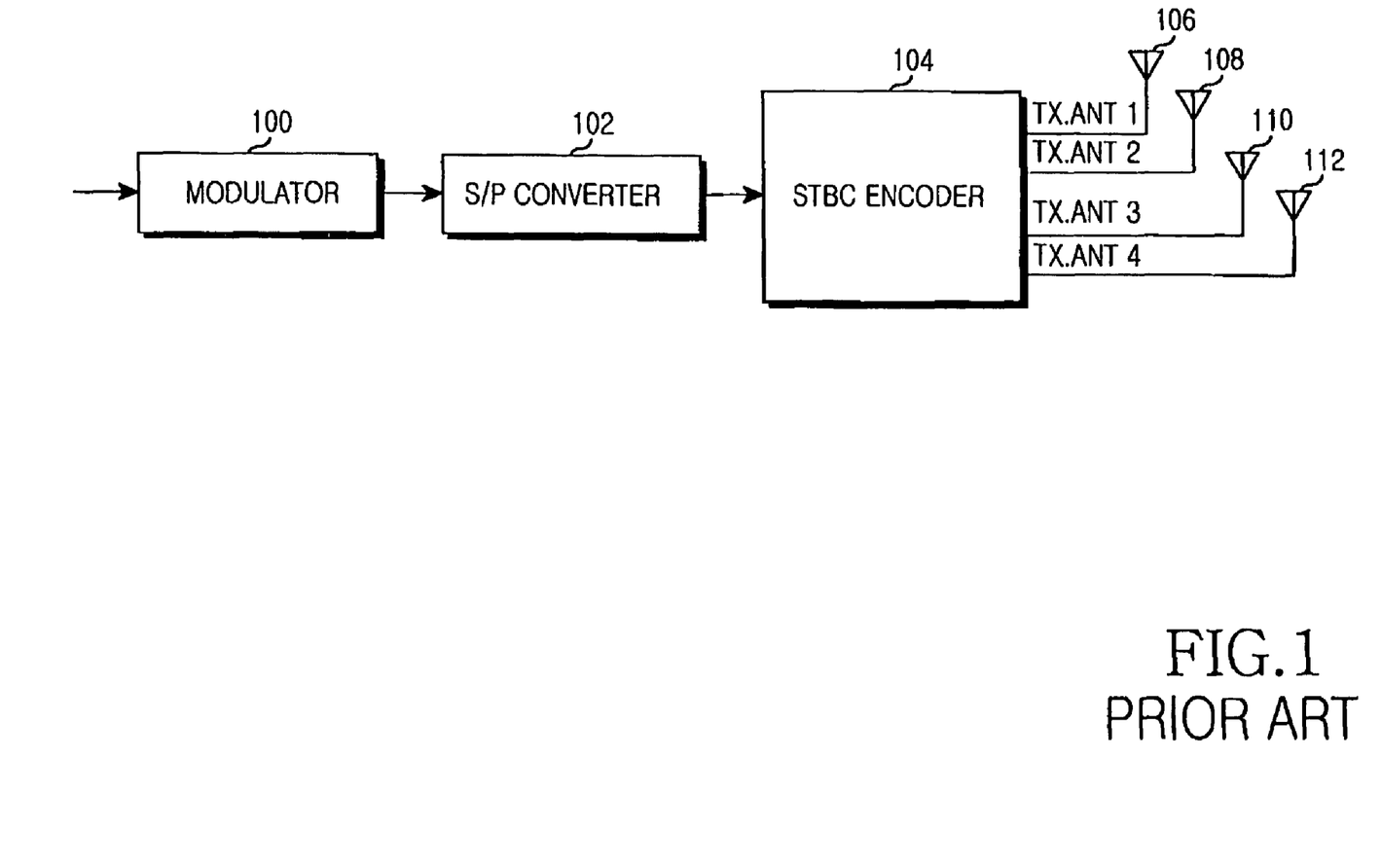
FIG. 1 is a block diagram of a typical transmitter in a wireless communication system using a conventional STBC scheme.

FIG. 1 is a block diagram of a transmitter in a wireless communication system using a conventional Space-Time Block Coding (STBC). Proposed by Tarokh, the transmitter is comprised of a modulator 100, a Serial-to-Parallel (S/P) converter 102, an STBC encoder 104, and four Tx antennas 106, 108, 110 and 112.

Referring to FIG. 1, the modulator 100 modulates input information data (or coded data) in a predetermined modulation scheme. The modulation scheme can be one of Binary Phase Shift Keying (BPSK), Quadrature Phase Shift Keying (QPSK), Quadrature Amplitude Modulation (QAM), Pulse Amplitude Modulation (PAM), and Phase Shift Keying (PSK).

The S/P converter 102 performs serial to parallel serial conversion modulation symbols received from the modulator 100, $s_1, s_2, s_3, s_4$. The STBC encoder 104 creates eight symbol combinations by STBC-encoding the four modulation symbols, $s_1, s_2, s_3, s_4$ and sequentially transmits them through the four Tx antennas 106 to 112. A coding matrix used to generate the eight symbol combinations is given as Equation 1:

$$G_4 = \begin{bmatrix} s_1 & s_2 & s_3 & s_4 \\ -s_2 & s_1 & -s_4 & s_3 \\ -s_3 & s_4 & s_1 & -s_2 \\ -s_4 & -s_3 & s_2 & s_1 \\ s_1^* & s_2^* & s_3^* & s_4^* \\ -s_2^* & s_1^* & -s_4^* & s_3^* \\ -s_3^* & s_4^* & s_1^* & -s_2^* \\ -s_4^* & -s_3^* & s_2^* & s_1^* \end{bmatrix} \quad (1)$$

where $G_4$ denotes the coding matrix for symbols transmitted through the four Tx antennas 106 to 112 and $s_1, s_2, s_3, s_4$ denote the input four symbols to be transmitted. The columns of the coding matrix correspond to the Tx antennas and the rows correspond to time intervals in which the four symbols are transmitted. Thus, the four symbols are transmitted through the four Tx antennas for eight time intervals.

Specifically, for a first time interval, $s_1$ is transmitted through the first Tx antenna 106, $s_2$ through the second Tx antenna 108, $s_3$ through the third Tx antenna 110, and $s_4$ through the fourth Tx antenna 112. In this manner, $-s_4^*, -s_3^*, s_2^*, s_1^*$ are transmitted through the first to fourth Tx antennas 106 to 112, respectively for an eighth time interval. That is, the STBC encoder 104 sequentially provides the symbols of an $i^{th}$ column in the coding matrix to an $i^{th}$ Tx antenna.

As described above, the STBC encoder 104 generates the eight symbol sequences using the input four symbols and their conjugates and negatives and transmits them through the four Tx antennas 106 to 112 for eight time intervals. Since the symbol sequences for the respective Tx antennas, that is, the columns of the coding matrix are mutually orthogonal, as high a diversity gain as a diversity order is achieved.

Figure 2:
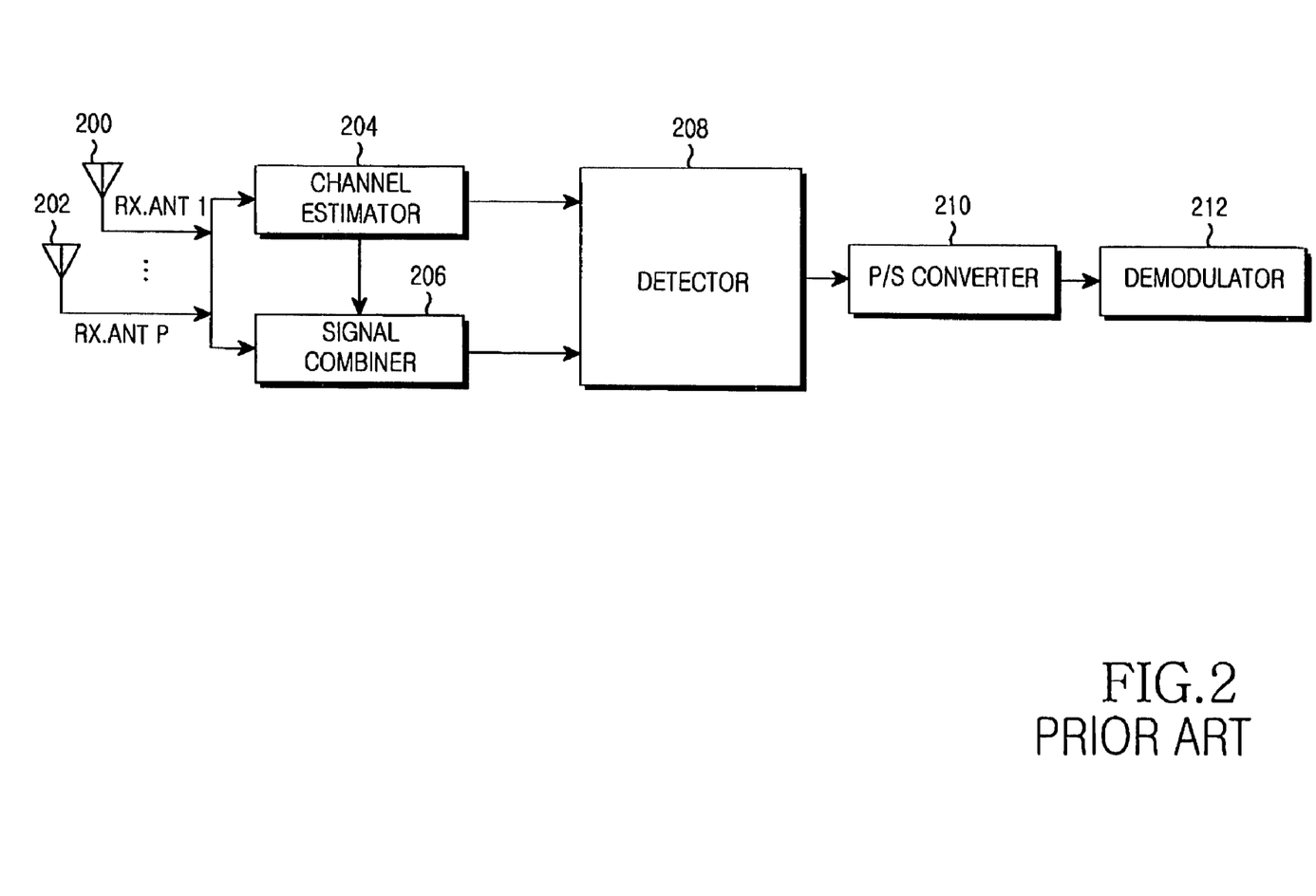
FIG. 2 is a block diagram of a typical receiver in the wireless communication system using the conventional STBC scheme.

FIG. 2 is a block diagram of a receiver in the wireless communication system using the conventional STBC scheme. The receiver is the counterpart of the transmitter illustrated in FIG. 1.

The receiver is comprised of a plurality of Rx antennas 200 to 202, a channel estimator 204, a signal combiner 206, a detector 208, a Parallel-to-Serial (P/S) converter 210, and a demodulator 212.

Referring to FIG. 2, first to $P^{th}$ Rx antennas 200 to 202 provide signals received from the four Tx antennas of the transmitter illustrated in FIG. 1 to the channel estimator 204 and the signal combiner 206.

The channel estimator 204 estimates channel coefficients representing channel gains from the Tx antennas 106 to 112 to the Rx antennas 200 to 202 using the signals received from the first to $P^{th}$ Rx antennas 200 to 202.

The signal combiner 206 combines the signals received from the first to $P^{th}$ Rx antennas 200 to 202 with the channel coefficients in a predetermined method.

The detector 208 generates hypothesis symbols using the combined symbols and the channel coefficients, calculates decision statistics for all possible transmitted symbols from the transmitter using the hypothesis symbols, and detects the actual transmitted symbols through threshold detection.

The P/S converter 210 performs parallel to serial conversion of the symbols received from the detector 208. The demodulator 212 demodulates the serial symbol sequence in a predetermined demodulation method, thereby recovering the original information bits.

As described above, the Tarokh scheme being an expansion of an Alamouti STBC technique offers the benefit of achieving a maximum diversity order using an STBC code in the form of a matrix with orthogonal columns. However, because four complex symbols are transmitted for eight time intervals, the Tarokh STBC scheme provides a rate of ½.

To achieve a full rate in a MIMO system that transmits complex signals through three or more Tx antennas, the Giannakis group presented a Full-Diversity, Full-Rate (FDFR) STBC for four Tx antennas using constellation rotation over a complex field.

Figure 3:
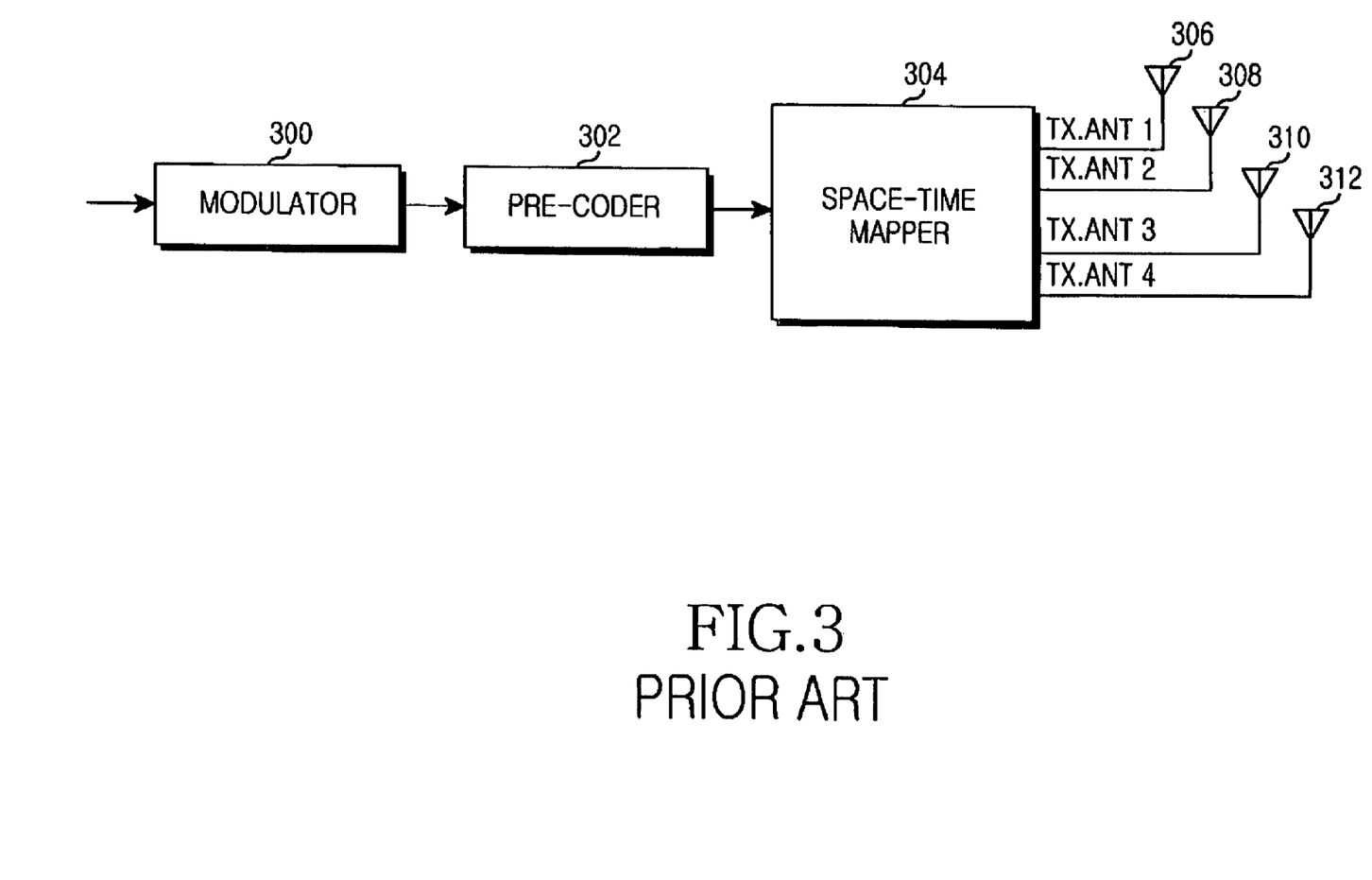
FIG. 3 is a block diagram of a typical transmitter in a wireless communication system using a conventional Giannakis STBC scheme.

FIG. 3 is a block diagram of a transmitter in a wireless communication system using the conventional Giannakis STBC scheme. As illustrated in FIG. 3, the transmitter includes a modulator 300, a pre-coder 302, a space-time mapper 304, and a plurality of Tx antennas 306, 308, 310 and 312.

Referring to FIG. 3, the modulator 300 modulates input information data (or coded data) in a predetermined modulation scheme such as BPSK, QPSK, QAM, PAM or PSK.

The pre-coder 302 pre-codes $N_t$ modulation symbols received from the modulator 300, $d_1$, $d_2$, $d_3$, $d_4$ such that signal rotation occurs in a signal space, and outputs the resulting $N_t$ symbols. For notational simplicity, four Tx antennas are assumed. Let a sequence of four modulation symbols from the modulator 300 be denoted by d. The pre-coder 302 generates a complex vector r by computing the modulation symbol sequence, d using the following Equation 2:

$$r = \Theta d = \begin{bmatrix} 1 & \alpha_0^1 & \alpha_0^2 & \alpha_0^3 \\ 1 & \alpha_1^1 & \alpha_1^2 & \alpha_1^3 \\ 1 & \alpha_2^1 & \alpha_2^2 & \alpha_2^3 \\ 1 & \alpha_3^1 & \alpha_3^2 & \alpha_3^3 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix} \quad (2)$$

where $\Theta$ denotes a pre-coding matrix. The Giannakis group uses a Vandermonde matrix being a unitary one as the pre-coding matrix. In the pre-coding matrix, $\alpha_i$ is given as Equation 3:

$$\alpha_i = \exp(j2\pi(i+¼)/4), i=0,1,2,3 \quad (3)$$

The Giannakis STBC scheme uses four Tx antennas and is easily extended to more than four Tx antennas, as well. The space-time mapper 304 STBC-encodes the pre-coded symbols in the following Equation 4:

$$S = \begin{bmatrix} r_1 & 0 & 0 & 0 \\ 0 & r_2 & 0 & 0 \\ 0 & 0 & r_3 & 0 \\ 0 & 0 & 0 & r_4 \end{bmatrix} \quad (4)$$

where S is a coding matrix for symbols to be transmitted through the four Tx antennas 306 to 312. The columns of the coding matrix correspond to the Tx antennas and the rows correspond to time intervals required to transmit the four symbols. That is, the four symbols are transmitted through the four Tx antennas for the four time intervals.

Upon receipt of the four symbols on a radio channel for the four time intervals, a receiver (not shown) recovers the modulation symbol sequence, d by Maximum Likelihood (ML) decoding.

As described above, Spatial Diversity (SD) achieves transmit diversity by transmitting the same data through multiple antennas. However, the diversity order increases with the number of transmit antennas but decreases a gain increase rate. In other words, as the number of antennas increases, the diversity order is saturated rather than linearly increasing.

In contrast, Spatial Multiplexing (SM) offers the benefit of high-speed data transmission without increasing the bandwidth of the system by transmitting different data at the same time using multiple antennas in the transmitter and the receiver.

Figure 4:
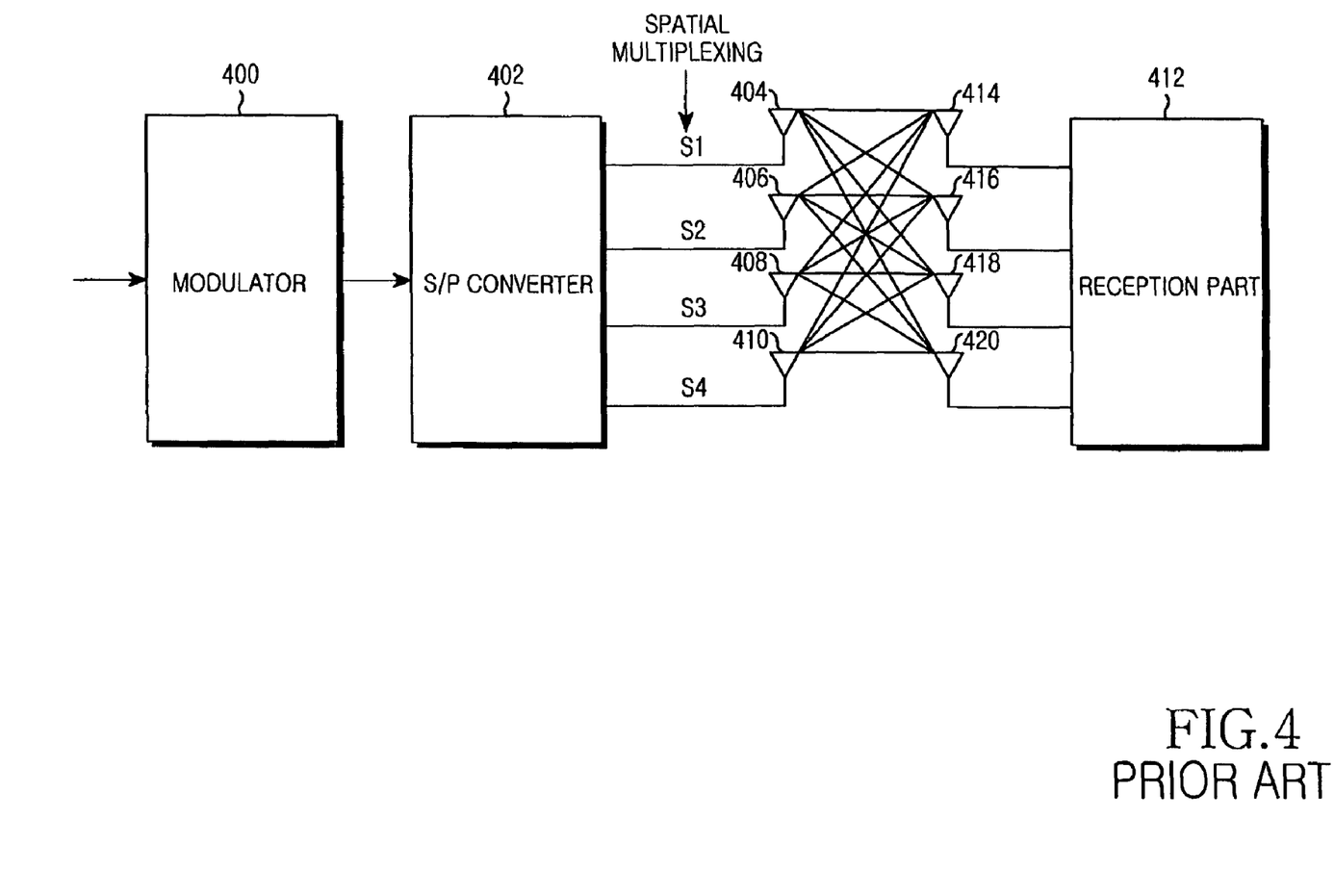
FIG. 4 is a block diagram of a typical wireless communication system using a conventional SM scheme.

FIG. 4 is a block diagram of a wireless communication system using a conventional SM scheme. As illustrated, a transmitter is comprised of a modulator 400, an S/P converter 402, and four Tx antennas 404, 406, 408 and 410. A receiver is comprised of four Rx antennas 414, 416, 418 and 420 and a reception part 412.

Referring to FIG. 4, the modulator 400 modulates input information data (or coded data) in a predetermined modulation scheme.

The S/P converter 302 spatially multiplexes four modulation symbols $s_1$, $s_2$, $s_3$, $s_4$ received from the modulator 400 as Equation 5:

$$S = \begin{bmatrix} s_1 \\ s_2 \\ s_3 \\ s_4 \end{bmatrix} \quad (5)$$

where the columns correspond to the Tx antennas and the rows correspond to time intervals required for transmitting the four transmission symbols. Since four symbols are transmitted for one time interval, the data rate is 4.

Meanwhile, the reception part 412 of the receiver estimates the transmitted symbols $s_1$, $s_2$, $s_3$, $s_4$ from signals received through the four Rx antennas 414, 416, 418 and 420.

As described above, there are a number of multiple antenna schemes (or MIMO schemes). Hence, an optimum multiple antenna scheme needs to be selected according to users' demands or situations. Since the wireless communication system is rapidly being developed to provide high-speed, high-quality service to users, it is expected that the number of Tx antennas will increase for better link performance. In this case, required MIMO schemes and required numbers of Tx antennas may differ for different users. In other words, users may request a throughput increase or a data reliability increase under circumstances. For example, a voice user may request a low error rate rather than a rate increase, whereas a data user may request a high rate.

Therefore, it is critical to support a multiple antenna scheme according to a user's situation in future communication systems.

Especially, there exists a need for a method of effectively providing a service to a plurality of users each adopting a different MIMO scheme and a different number of antennas without modifying the existing frame structure, when the number of Tx antennas increases in legacy systems.

SUMMARY OF THE INVENTION

An object of the present invention is to substantially solve at least the above problems and/or disadvantages and to provide at least the advantages below. Accordingly, an object of the present invention is to provide an apparatus and method for effectively providing a service to a plurality of users each using a different MIMO scheme and a different number of antennas in a multiple-antenna wireless communication system.

Another object of the present invention is to provide an apparatus and method for providing a seamless new service with an increased number of Tx antennas in a multiple-antenna wireless communication system.

A further object of the present invention is to provide an apparatus and method for extending the number of Tx antennas without modifying the frame structure in a multiple-antenna wireless communication system.

Still another object of the present invention is to provide an apparatus and method for improving link performance by extending the number of Tx antennas in a multiple-antenna wireless communication system.

The above objects are achieved by providing an apparatus and method for simultaneously providing service to users each having a different number of antennas in a multiple-antenna wireless communication system.

According to one aspect of the present invention, a BS in a wireless communication system that services a first multiple antenna mode using X transmit antennas and a second multiple antenna mode using Y transmit antennas (Y>X), determines an MS to be serviced in the second multiple antenna mode and receives a sounding signal from the MS. The BS estimates an uplink channel using the received sounding signal and acquires downlink channel values using estimated uplink channel values. Then the BS services the MS in the second multiple antenna mode using the downlink channel values.

According to another aspect of the present invention, an MS in a wireless communication system that services a first multiple antenna mode using X transmit antennas and a second multiple antenna mode using Y transmit antennas (Y>X), determines whether to perform the second multiple antenna mode according to a predetermined criterion. If the second multiple antenna mode can be performed, the MS requests the second multiple antenna mode to a BS and receives signals transmitted through the Y transmit antennas of the BS in the second multiple antenna mode.

According to a further aspect of the present invention, in a communication method in a wireless communication system that services a first multiple antenna mode using X transmit antennas and a second multiple antenna mode using Y transmit antennas (Y>X), a BS determines an MS to be serviced in the second multiple antenna mode and requests a sounding signal from the MS. The MS transmits the sounding signal to the BS. The BS estimates an uplink channel using the received sounding signal and acquires downlink channel values using estimated uplink channel values. The BS services the MS in the second multiple antenna mode using the downlink channel values and the MS receives signals through Y antennas of the BS.

According to still another aspect of the present invention, in a transmitter in a wireless communication system that services a first multiple antenna mode using X transmit antennas and a second multiple antenna mode using Y transmit antennas (Y>X), if an MS is determined to be serviced in the second multiple antenna mode, a channel estimator acquires downlink channel values for the MS. A weight generator generates a weight matrix using the downlink channel values. A weight multiplier multiplies data for the MS by the weight matrix and transmits the multiplied data through the Y transmit antennas by beam forming.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail because they would obscure the invention with unnecessary details.

The present invention is directed to a technique for effectively servicing a plurality of MSs each operating in a different MIMO scheme and having a different number of antennas, when the number of Tx antennas is increased to improve link performance.

The following description is made in the context of a system where a transmitter (or BS) has four more Tx antennas in addition to existing four Tx antennas. Use of four antennas is defined as a basic MIMO mode and use of eight antennas is defined as an extended MIMO mode.

While the present invention is applicable to any communication system operating in Frequency Division Multiple Access (FDMA), Time Division Multiple Access (TDMA), Code Division Multiple Access (CDMA), or OFDM, the OFDM communication system is used for the following description, by way of example.

Figure 5:
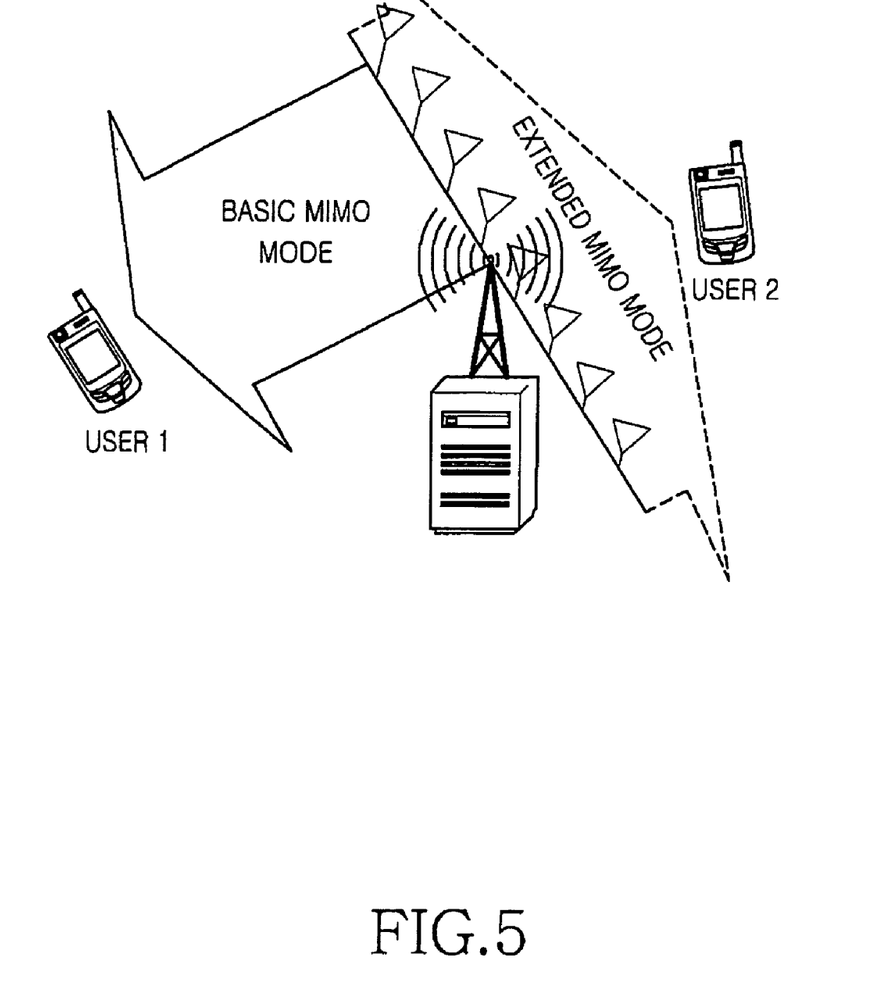
FIG. 5 illustrates the concept of an extended MIMO mode according to the present invention.

Referring to FIG. 5, a single system simultaneously services the basic MIMO mode and the extended MIMO mode. As stated before, the basic MIMO mode is implemented with four Tx antennas and the extended MIMO mode with eight Tx antennas. In the basic MIMO mode, the four Tx antennas send every control information, every pilot, and every preamble.

A detailed description is made below of the extended MIMO mode.

A user (i.e. MS) using an Adaptive Modulation and Coding (AMC) subchannel defined by Institute of Electrical and Electronics Engineers (IEEE) 802.16e, for example, is in a relatively good channel status. The channel status is estimated by uplink channel sounding and a service is provided to the user in the extended MIMO mode based on the channel status estimation.

To be more specific, the user monitors his channel status. If he determines that he can be serviced in the extended MIMO mode, he requests a grant to a BS. If the extended MIMO mode is allowed, the user sends a sounding packet (or a sounding signal) over a band that he occupies to the BS. To reduce the burden of sounding, sounding is not performed over the total band. The term "sounding" refers to detection of a channel status using a known signal (e.g. a pilot signal).

Meanwhile, the BS estimates the channel status of the user through uplink channel sounding and supports the extended MIMO mode based on the channel status estimate in the following two ways. These two ways are mere examples and thus the extended MIMO mode can be supported with any other multiple antenna strategy.

1. Eigen Beamforming Using Singular Value Deposition (SVD)

The BS first estimates an uplink channel status by uplink channel sounding and acquires a downlink channel response matrix by calibrating the estimated uplink channel values. The BS then calculates a BS weight matrix (V matrix) by SVD of the channel response matrix and sends a transmission packet to the MS through the eight Tx antennas by beamforming based on the BS weight matrix. An MS weight matrix (U matrix) acquired from the SVD of the channel response matrix is sent to the MS, for use in signal demodulation. The BS updates the weight matrices by periodic uplink channel sounding, for example.

The calibration of uplink channel values to obtain downlink channel values is based on the assumption of a Time Division Duplexing (TDD) system. In the case of a Frequency Division Duplexing (FDD) system, the MS acquires a channel response matrix by measuring a downlink channel, calculates a BS weight matrix through decomposition of the channel response matrix, and feeds back the BS weight matrix to the BS. While the feedback can be used for the TDD system, pilot signal must be sent through the eight antennas, which requires a modification to an existing frame structure.

2. Antenna Selection and Codebook-Based Pre-Coding

The BS selects four active antennas among the eight antennas according to channel values. For the antenna selection, a "maximum Frobenius Norm" or the "lowest correlation" may be used. The BS then subjects the selected antennas to codebook-based pre-coding. For example, a pre-stored codebook is searched for a pre-coding matrix (or a singular matrix) using a Signal-to-Noise Ratio (SNR) or a channel value. A packet for the MS is beamformed using the singular matrix and sent through the four active antennas.

The data transmission to the user with eight antennas by beamforming improves link performance and thus increases throughput. The following description is made mainly of SVD-based beamforming.

Figure 6:
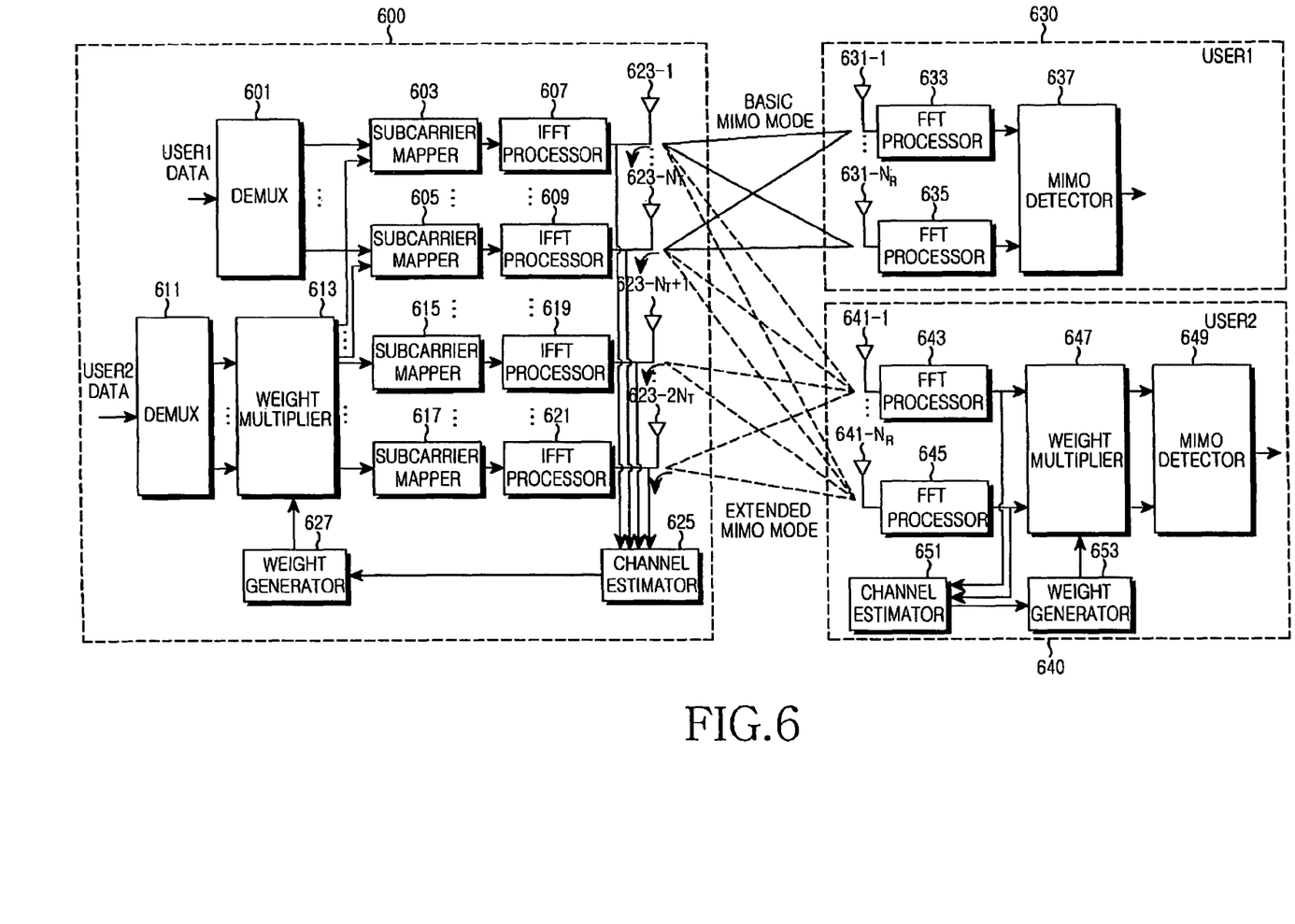
FIG. 6 is a block diagram of a multiple-antenna wireless communication system according to the present invention.

FIG. 6 is a block diagram of a multiple-antenna wireless communication system according to the present invention. As with the case of FIG. 5, a service is simultaneously provided to User 1 (MS 1) in the basic MIMO mode and to User 2 (MS 2) in the extended MIMO mode in the case illustrated in FIG. 6. Signal transmission is carried out for User 1 (an MS 630) by SM and for User 2 (an MS 640) by SVD. It is assumed herein that a BS 600 has eight antennas and the MSs 630 and 640 each has four antennas.

In general, transmission data is encoded and modulated in a channel encoder and a modulator, prior to transmission. For notational simplicity, the subsequent operation after channel coding and modulation will be described below. In the transmitter 600, a demultiplexer (DEMUX) 601 demultiplexes data for User 1 (User 1 data) into as many data as the number of antennas operating for the basic MIMO mode. A first subcarrier mapper 603 maps data to be sent through a first antenna 623-1 (first antenna data) received from the DEMUX 601 and first antenna data received from a weight multiplier 613 to predetermined subcarriers.

Specifically, the first subcarrier mapper 603 maps User 1 data received from the DEMUX 601 to subcarriers allocated to User 1, and maps User 2 data received from the weight multiplier 613 to subcarriers allocated to User 2. In the same manner, second, third and fourth subcarrier mappers map User 1 data received from the DEMUX 601 and User 2 data received from the weight multiplier 613 to predetermined subcarriers.

A first Inverse Fast Fourier Transform (IFFT) processor 607 IFFT-processes the data from the first subcarrier mapper 603 and sends the IFFT signal through the first antenna 623-1. In real implementation, the IFFT signal is converted to an analog signal and the analog baseband signal is upconverted to a Radio Frequency (RF) signal, prior to transmission through the first antenna 623-1. Second, third and fourth IFFT processors process data received from corresponding subcarrier mappers and send the IFFT signals through corresponding antennas. That is, the User 1 signal and the User 2 signal are sent simultaneously through the first to fourth antennas.

A DEMUX 611 demultiplexes input User 2 data into as many data as the number of valid singular vectors. A channel estimator 625 calculates a 4×8 channel response matrix using uplink channel sounding signals received through the eight antennas 623-1 to 623-2$N_T$. A weight generator 627 generates a BS weight matrix (V matrix), an MS weight matrix (U matrix), and a singular value matrix (a D matrix) by SVD of the channel response matrix. The V matrix is provided to the weight multiplier 613 and the U matrix to the MS 640 (User 2).

The weight multiplier 613 multiplies a transmission vector received from the DEMUX 611 by the V matrix received from the weight generator 627. The resulting eight symbols are provided to the respective subcarrier mappers 603 to 617. A fifth subcarrier mapper 615 corresponding to a fifth antenna 623-$N_T$+1 maps fifth antenna data received from the weight multiplier 613 to predetermined subcarriers. Similarly, sixth, seventh and eighth subcarrier mappers map data received from the weight multiplier 613 to predetermined subcarriers.

A fifth IFFT processor 619 processes the data received from the fifth subcarrier mapper and sends the IFFT signal through the fifth antenna 623-$N_T$+1. In the same manner, sixth, seventh and eighth IFFT processors process data received from the sixth, seventh and eighth subcarrier mappers and send the IFFT signals through sixth, seventh, and eighth antennas. The fifth to eighth antennas added for the extended MIMO mode are confined to the data for the user using the extended MIMO mode.

The operations of the MSs 630 and 640, which receive the signals from the transmitter 600, will be described.

In the MS 630 serviced in the basic MIMO mode, signals received through a plurality of antennas 631-1 to 631-$N_R$ are downconverted to baseband signals, converted to digital signals, and provided to corresponding Fast Fourier Transform (FFT) processors 633 to 635. The FFT processors 633 to 635 FFT-process the digital signals (sample data). A MIMO detector 637 decodes the FFT signals in accordance with a predetermined MIMO scheme and outputs received symbols. The received symbols are demodulated and decoded in a demodulator and a channel decoder, thereby recovering the original information data.

In the MS 640 serviced in the extended MIMO mode, signals received through a plurality of antennas 641-1 to 641-$N_R$ are downconverted to baseband signals, converted to digital signals, and provided to corresponding FFT processors 643 to 645. The FFT processors 643 to 645 process the digital signals (sample data).

A channel estimator 651 extracts pilot signals (or sounding signals) from the FFT signals and calculates a channel response matrix using the pilot signals. When the BS sends four pilot signals through eight antennas by beamforming, the channel response matrix is a 4×4 matrix.

A weight generator 653 generates a weight matrix (e.g. a $U^H$ matrix) using the channel response matrix received from the channel estimator 651 or information received from the BS. A weight multiplier 647 multiplies the FFT signals by the weight matrix. A MIMO detector 649 decodes the product signals in accordance with a predetermined MIMO scheme and outputs received symbols. The received symbols are demodulated and decoded in a demodulator and a channel decoder, thereby recovering the original information data.

While SM and SVD are adopted as multiple antenna schemes for the basic MIMO mode and the extended MIMO mode, respectively, in the embodiment illustrated in FIG. 6; STBC or a hybrid strategy combining STC and SM is available for the basic MIMO mode and an SVD-based scheme, a codebook-based scheme, or a hybrid scheme combining STC and beamforming is available for the extended MIMO mode.

For a better understanding of the present invention, a brief description will be made of an SVD-MIMO scheme.

Given $N_T$ Tx antennas and $N_R$ Rx antennas in a MIMO system, it can be said that a channel H that experiences data during transmission from a transmitter to a receiver is an $N_R \times N_T$ random matrix. SVD of the channel matrix H leads to Equation 6:

$$H = UDV^H \quad (6)$$

where U denotes an $N_R \times N_R$ unitary matrix with the eigenvectors of $HH^H$ in columns, known as an Rx eigenvector matrix, V denotes an $N_T \times N_T$ matrix known as a Tx eigenvector matrix whose columns are the eigenvectors of $HH^H$, and D denotes a singular value matrix having the square roots of non-zero eigenvalues of $HH^H$ on its diagonal.

In the multiple-antenna communication system, the relationship between transmission and reception is typically expressed as Equation 7:

$$Y = HX + N \quad (7)$$

where Y denotes an $N_R \times 1$ Rx symbol matrix (or vector), X denotes an $N_T \times 1$ Tx symbol matrix (or vector), H denotes an $N_R \times N_T$ matrix, and N denotes an $N_R \times 1$ Additive White Gaussian Noise (AWGN) matrix. Thus, the Tx symbol matrix X is received at the receiver on the channel of the H matrix, added with the N matrix being a noise component.

In the SVD-MIMO system, the transmitter multiplies the Tx symbol matrix X by the V matrix, prior to transmission, as in Equation 8:

$$X' = V \cdot X \quad (8)$$

Meanwhile, the receiver performs MIMO detection by multiplying the Rx symbol matrix Y by the $U^H$ matrix in Equation 9:

$$Y' = U^H \cdot Y \quad (9)$$

which equals to the result shown in Equation 10:

$$\begin{aligned} Y' &= U^H VDOTY \\ &= U^H HVX + U^H N \\ &= U^H UDV^H VX + U^H N \\ &= DX + U^H N \end{aligned} \quad (10)$$

On the assumption that $N_T \leq N_R$, the Y' matrix is given as Equation 11:

$$Y' = \begin{bmatrix} y'_1 \\ y'_2 \\ \vdots \\ y'_{N_R} \end{bmatrix} = \begin{bmatrix} \lambda_1 & 0 & \cdots & 0 \\ 0 & \lambda_2 & \cdots & 0 \\ \vdots & \vdots & \cdots & \vdots \\ 0 & 0 & \cdots & \lambda_{N_T} \\ 0 & 0 & 0 & 0 \end{bmatrix} \begin{bmatrix} x_1 \\ x_2 \\ \vdots \\ x_{N_T} \end{bmatrix} + \begin{bmatrix} n'_1 \\ n'_2 \\ \vdots \\ n'_{N_R} \end{bmatrix} \quad (11)$$

As noted from Equation (11), since the SVD-MIMO system is interpreted as multiple Single Input Single Output (SISO) systems, it can detect received symbols easily. The extended MIMO mode is supported by this SVD scheme in the embodiment of the present invention.

Figure 7:
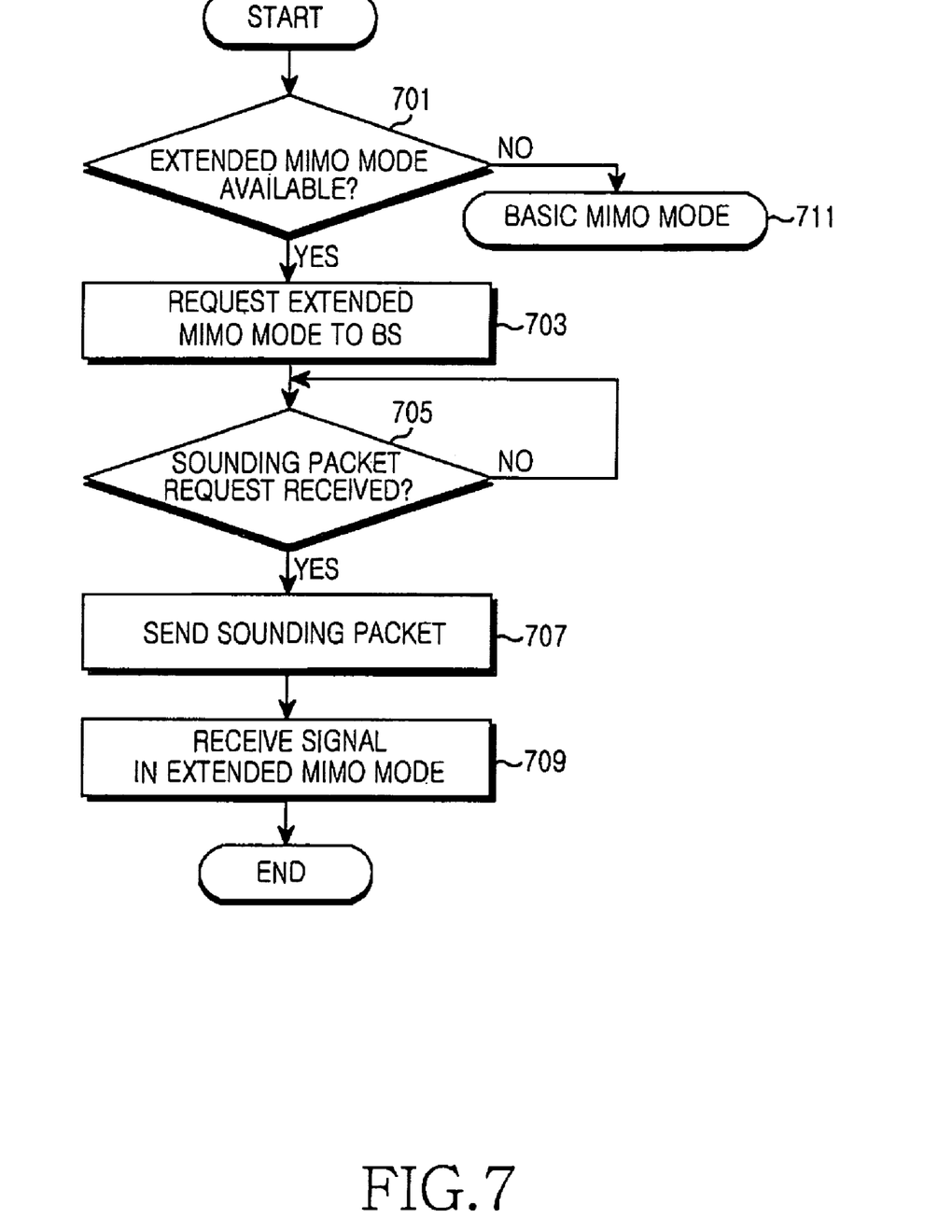
FIG. 7 is a flowchart illustrating an operation for receiving a service in the extended MIMO mode in a Mobile Station (MS) using multiple antennas according to the present invention.

Referring to FIG. 7, the MS determines whether it can operate in the extended MIMO mode, taking into account various parameters in step 701. The criterion of the determination can be channel status, channel change, or the MS's velocity. For example, if the channel status is equal to or higher than a predetermined threshold, the MS determines that it can be serviced in the extended MIMO mode.

If determining that the extended MIMO mode is not available, the MS operates in the basic MIMO mode in step 711. In contrast, if determining that the extended MIMO mode is available, the MS requests the extended MIMO mode to the BS in step 703. The BS then determines whether it can service the MS in the extended MIMO mode. If it can, the BS requests a sounding packet to the MS.

Thereafter, the MS monitors reception of the sounding packet request from the BS in step 705. Upon receipt of the sounding packet request, the MS sends a sounding packet to the BS over a band that the MS occupies in step 707. The reason for sending the sounding packet over the occupied band is to reduce the burden that might be added by sending the sounding packet over the total band. Yet, it is a mere exemplary application and thus the sounding packet can be sent over the total band, when needed.

The BS estimates the channel using the sounding packet and calculates a downlink channel response matrix by calibrating the estimated up link channel values. The BS then acquires a weight matrix using the channel response matrix and sends a packet for the MS by beamforming using the weight matrix through eight antennas.

After receiving the sounding packet, the MS is serviced in the extended MIMO mode in step 709.

Figure 8:
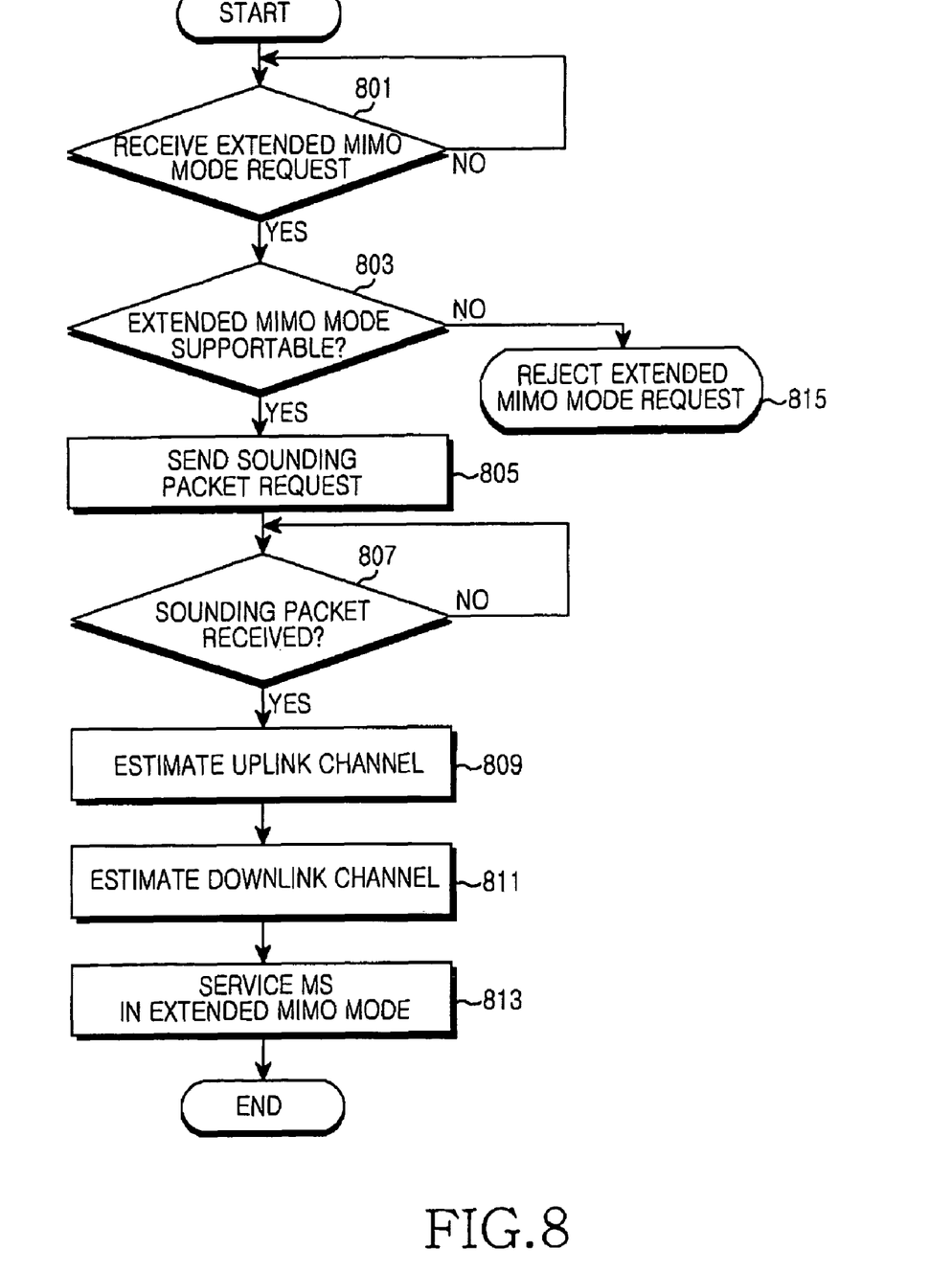
FIG. 8 is a flowchart illustrating an operation for providing a service in the extended MIMO mode in a Base Station (BS) using multiple antennas according to the present invention.

Referring to FIG. 8, the BS monitors reception of a request for the extended MIMO mode from an MS in step 801. Upon receipt of the extended MIMO mode request, the BS determines whether it can service the MS in the extended MIMO mode, taking into account the system situation in step 803.

If it determines that it cannot service the MS in the extended MIMO mode, the BS rejects the extended MIMO request in step 815. On the contrary, if it determines that it can service the MS in the extended MIMO mode, the BS sends a sounding packet request to the MS in step 805. The MS then sends a known signal (i.e. a sounding packet) to the BS over a band that the MS occupies.

Thereafter, the BS monitors reception of the sounding packet from the MS in step 807. Upon receipt of the sounding packet, the BS estimates the uplink channel using the sounding packet in step 809. In step 811, the BS calculates a downlink channel response matrix by calibrating the estimated uplink channel values.

The BS then calculates a weight matrix using the downlink channel response matrix and sends a transmission packet to the MS by beamforming through eight antennas, that is, in the extended MIMO mode in step 813. As stated before, any other multiple antenna strategy (e.g. STC, STBC, etc.) can be used instead of a beamforming scheme such as SVD-based beamforming or codebook-based pre-coding.

In the embodiment described in FIGS. 7 and 8, the MS requests the extended MIMO mode, and the BS determines whether to apply the extended MIMO mode and notifies the MS of the determination result. Yet, it can be further contemplated as another embodiment of the present invention that the BS determines whether to support the extended MIMO mode for the MS and notifies the MS of the determination result, without receiving the MS's request.

The present invention was simulated at a link level and performance was evaluated in terms of throughput. An OFDM system with four Rx antennas (N=4) and 64 subcarriers was taken, and a 9-tap frequency selective channel with no correlation between antennas was assumed. One packet was 100 bits and modulated in one of BPSK to 64QAM. Throughput was assessed for four Tx antennas (M=4) and eight Tx antennas (M=8), respectively.

Figure 9:
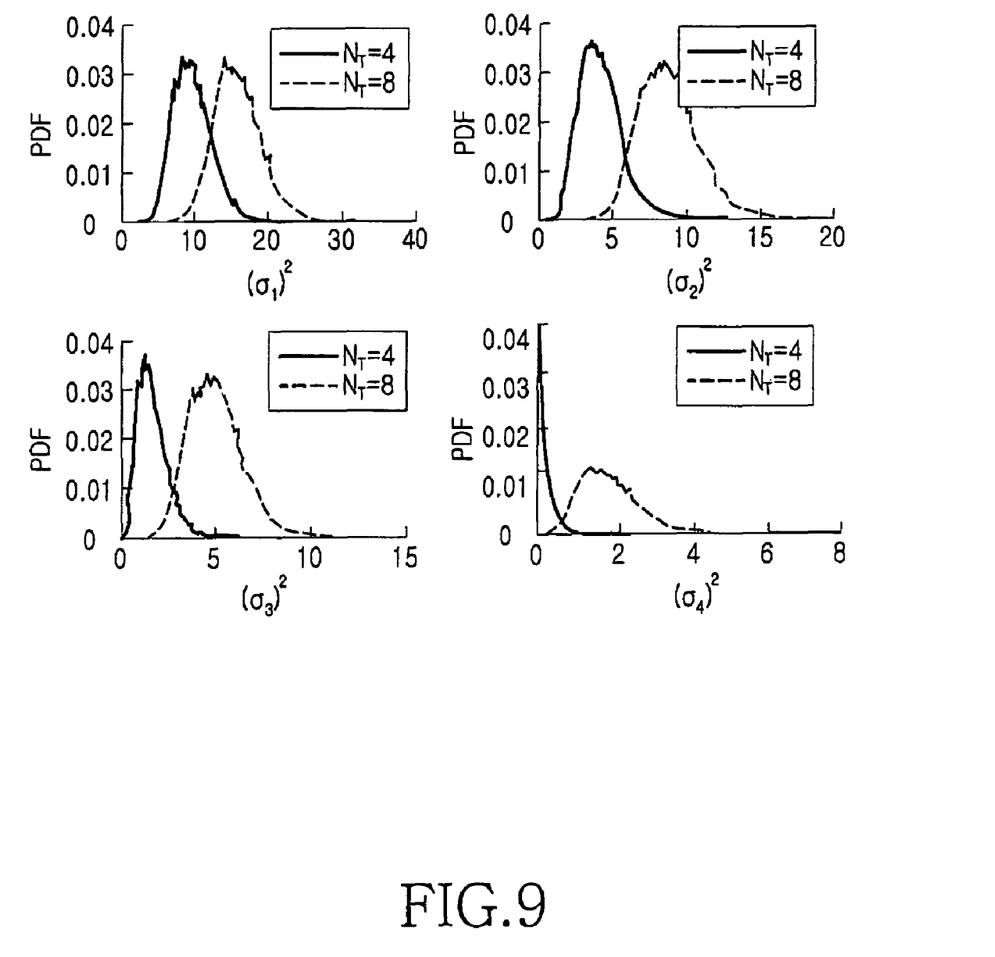
FIG. 9 shows graphs of singular value distributions for four Tx antennas and eight Tx antennas.

Referring to FIG. 9, singular values $\sigma_1$, $\sigma_2$, $\sigma_3$ and $\sigma_4$ have higher power on the whole when M=8 than when M=4. Thus, under the same channel environment and noise, error-free detection is possible at a higher modulation level when eight Tx antennas are used. In other words, throughput is higher when M=8.

Figure 10:
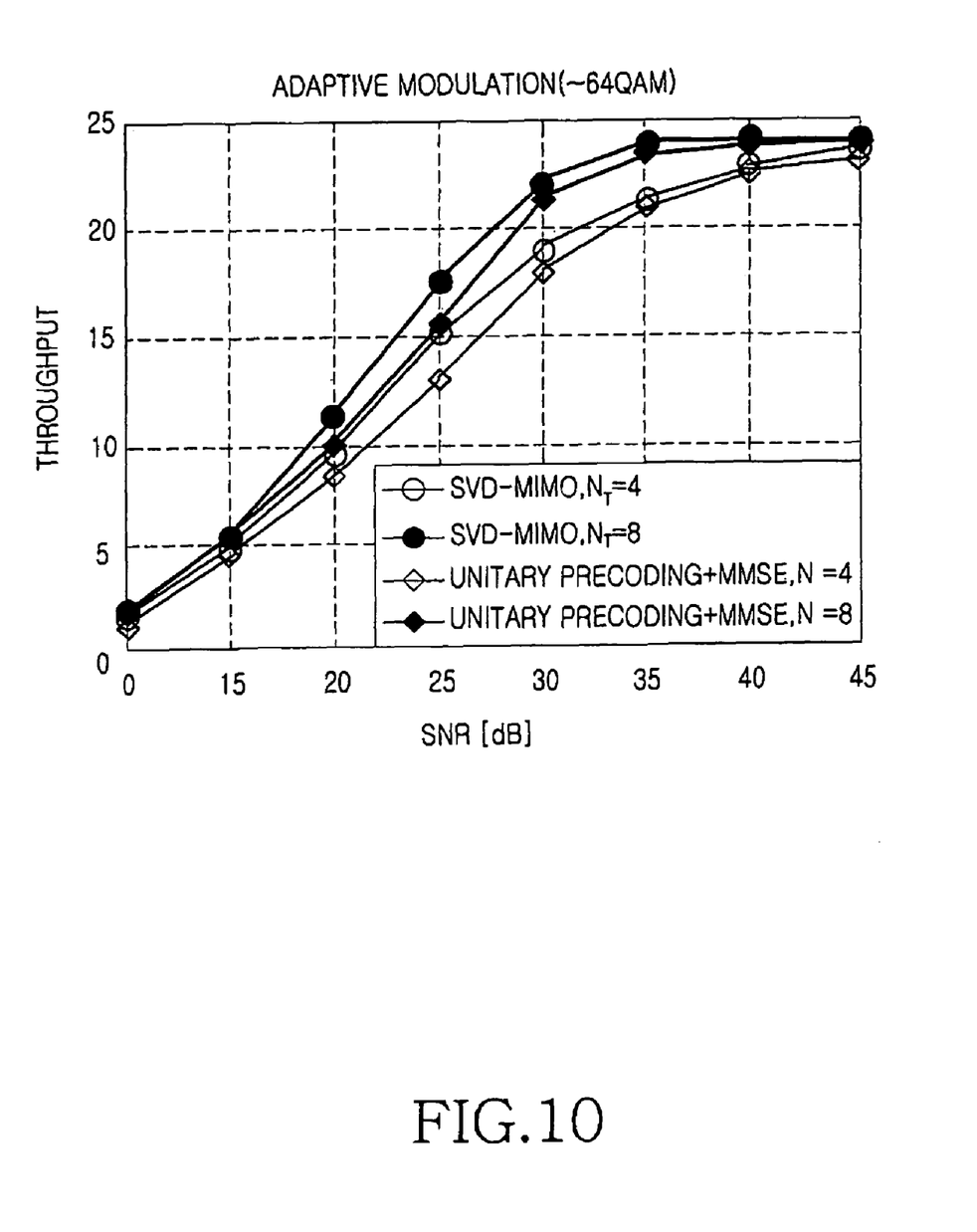
FIG. 10 is a graph illustrating throughput for different numbers of antennas.

As noted from the graph of FIG. 10, the use of eight Tx antennas offers a higher throughput than the use of four Tx antennas. In this way, the link performance can be improved simply by adding antennas (including RF modules). For example, in the case of four streams and 4Tx, all of four streams may not be sent because a fourth eigenvalue or singular value is too small in real implementation. However, all of four eigenvalues have substantially high power with the use of eight antennas, which enables reliable transmission of the four streams according to the present invention.

In particular, an existing frame structure can still be used without any modification even though antennas are added. Hence, a service provider does not need to design and install a new system.

In accordance with the present invention as described above, because there is no need for a new frame structure in implementing the extended MIMO mode, a service provider does not have to design and deploy a new system. Also, the number of antennas can be extended simply using antennas and cheap amplifiers in existing systems. Particularly, a service can be simultaneously provided to a user of the basic MIMO mode and another user of the extended MIMO mode.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A communication method in a Base Station (BS) in a wireless communication system that services a first multiple antenna mode using X transmit antennas comprising an antenna group A and a second multiple antenna mode using Y transmit antennas comprising a combination of the antenna group A and an antenna group B where (Y>X), comprising the steps of:
    determining a Mobile Station (MS) to be serviced in the second multiple antenna mode;
    receiving a sounding signal from the MS;
    estimating an uplink channel using the received sounding signal and acquiring downlink channel values using estimated uplink channel values; and
    servicing the MS in the second multiple antenna mode using the downlink channel values,
    wherein the X transmit antennas of the antenna group A are utilized to send all control information, every pilot, every preamble, and data signals for at least one MS in the first multiple antenna mode and data signals for at least one MS in the second multiple antenna mode, and
    wherein the difference between Y and X transmit antennas (Y−X) comprising the antenna group B are utilized to send only data signals for at least one MS in the second multiple antenna mode.

2. The communication method of claim 1, wherein determining the MS to be serviced in the second multiple antenna mode comprises:
    receiving a request for the second multiple antenna mode from the MS; and
    determining whether to service the MS in the second multiple antenna mode.

3. The communication method of claim 1, wherein determining the MS to be serviced in the second multiple antenna mode comprises:
    determining the MS to be serviced in the second multiple antenna mode according to at least one of the channel status, channel change, and velocity of the MS.

4. The communication method of claim 1, wherein servicing the MS in the second multiple antenna mode comprises:
    determining a multiple antenna scheme for the MS; and
    processing data for the MS in the determined multiple antenna scheme and transmitting the processed data through the Y transmit antennas.

5. The communication method of claim 4, wherein the multiple antenna scheme is one of codebook-based beamforming and Singular Value Deposition (SVD)-based beamforming.

6. The communication method of claim 4, wherein transmitting the processed data comprises:
   determining a weight matrix using the downlink channel values;
   generating a plurality of antenna signals by beamforming of the data using the weight matrix; and
   transmitting the plurality of antenna signals through corresponding antennas.

7. The communication method of claim 4, wherein transmitting the processed data comprises:
   determining a weight matrix using the downlink channel values;
   selecting a predetermined number of active antennas in good channel status among the Y antennas;
   generating a plurality of antenna signals by beamforming of the data using the weight matrix; and
   transmitting the plurality of antenna signals through the active antennas.

8. The communication method of claim 7, wherein selecting the predetermined number of active antennas comprises selecting the active antennas based on one of a maximum Frobenius norm and the lowest correlation.

9. The communication method of claim 1, further comprising servicing the MS in the first multiple antenna mode prior to determining the MS to be serviced in the second multiple antenna mode.

10. A communication method in a Mobile Station (MS) in a wireless communication system that services a first multiple antenna mode using X transmit antennas comprising an antenna group A and a second multiple antenna mode using Y transmit antennas comprising a combination of the antenna group A and an antenna group B where (Y>X), comprising the steps of:
    determining whether to perform the second multiple antenna mode according to a predetermined criterion;
    requesting the second multiple antenna mode to a Base Station (BS), if the second multiple antenna mode can be performed; and
    receiving signals transmitted through the Y transmit antennas of the BS in the second multiple antenna mode,
    wherein the X transmit antennas of the antenna group A are utilized to send all control information, every pilot, every preamble, and data signals for at least one MS in the first multiple antenna mode and data signals for at least one MS in the second multiple antenna mode, and
    wherein the difference between Y and X transmit antennas (Y–X) comprising the antenna group B are utilized to send only data signals for at least one MS in the second multiple antenna mode.

11. The communication method of claim 10, further comprising transmitting a sounding signal to the BS upon receipt of a sounding request from the BS, after requesting the second multiple antenna mode.

12. The communication method of claim 10, wherein the predetermined criterion is at least one of channel status, channel change, and velocity.

13. The communication method of claim 10, further comprising being serviced in the first multiple antenna mode prior to determining whether to perform the second multiple antenna mode.

14. A communication method in a Base Station (BS) in a wireless communication system that services a first multiple antenna mode using X transmit antennas comprising an antenna group A and a second multiple antenna mode using Y transmit antennas comprising a combination of the antenna group A and an antenna group B where (Y>X), comprising the steps of:
    determining a Mobile Station (MS) to be serviced in the second multiple antenna mode;
    acquiring downlink channel values for the MS;
    generating a weight matrix using the downlink channel values; and
    multiplying data for the MS by the weight matrix and transmitting the multiplied data through the Y transmit antennas by beamforming,
    wherein the X transmit antennas of the antenna group A are utilized to send all control information, every pilot, every preamble, and data signals for at least one MS in the first multiple antenna mode and data signals for at least one MS in the second multiple antenna mode, and
    wherein the difference between Y and X transmit antennas (Y–X) comprising the antenna group B are utilized to send only data signals for at least one MS in the second multiple antenna mode.

15. The communication method of claim 14, wherein acquiring downlink channel values comprises:
    estimating an uplink channel using a sounding signal received from the MS; and
    acquiring the downlink channel values by calibrating estimated uplink channel values.

16. The communication method of claim 14, wherein the weight matrix is a codebook-based pre-coding matrix.

17. The communication method of claim 14, wherein the weight matrix is a Singular Value Deposition (SVD)-based singular vector matrix.

18. The communication method of claim 14, wherein transmitting the multiplied data comprises:
    generating a plurality of antenna signals by beamforming of the data using the weight matrix; and
    transmitting the plurality of antenna signals through corresponding antennas.

19. The communication method of claim 14, wherein transmitting the multiplied data comprises:
    selecting a predetermined number of active antennas in good channel status among the Y antennas;
    generating a plurality of antenna signals by beamforming of the data using the weight matrix; and
    transmitting the plurality of antenna signals through the active antennas.

20. The communication method of claim 14, further comprising servicing the MS in the first multiple antenna mode prior to determining the MS to be serviced in the second multiple antenna mode.

21. A communication method in a wireless communication system that services a first multiple antenna mode using X transmit antennas comprising an antenna group A and a second multiple antenna mode using Y transmit antennas comprising a combination of the antenna group A and an antenna group B where (Y>X), comprising the steps of:
    determining a Mobile Station (MS) to be serviced in the second multiple antenna mode and requesting a sounding signal to the MS by a Base Station (BS);
    transmitting the sounding signal by the MS;
    estimating an uplink channel using the received sounding signal and acquiring downlink channel values using estimated uplink channel values by the BS;
    servicing the MS in the second multiple antenna mode using the downlink channel values by the BS; and
    receiving signals through the Y transmit antennas of the BS by the MS,
    wherein the X transmit antennas of the antenna group A are utilized to send all control information, every pilot, every preamble, and data signals for at least one MS in the first multiple antenna mode and data signals for at least one MS in the second multiple antenna mode, and wherein the difference between Y and X transmit antennas (Y−X) comprising the antenna group B are utilized to send only data signals for at least one MS in the second multiple antenna mode.

22. The communication method of claim 21, wherein servicing the MS in the second multiple antenna mode comprises:

determining a multiple antenna scheme for the MS; and processing data for the MS in the determined multiple antenna scheme and transmitting the processed data through the Y transmit antennas.

23. The communication method of claim 22, wherein the multiple antenna scheme is one of codebook-based beamforming and Singular Value Deposition (SVD)-based beamforming.

24. The communication method of claim 21, further comprising servicing the MS in the first multiple antenna mode by the BS prior to determining the MS to be serviced in the second multiple antenna mode.

25. A transmitter in a wireless communication system that services a first multiple antenna mode using X transmit antennas comprising an antenna group A and a second multiple antenna mode using Y transmit antennas comprising a combination of the antenna group A and an antenna group B where (Y>X), comprising:

a channel estimator for acquiring downlink channel values for the MS, if a Mobile Station (MS) is determined to be serviced in the second multiple antenna mode;

a weight generator for generating a weight matrix using the downlink channel values; and a weight multiplier for multiplying data for the MS by the weight matrix and transmitting the multiplied data through the Y transmit antennas by beamforming, wherein the X transmit antennas of the antenna group A are utilized to send all control information, every pilot, every preamble, and data signals for at least one MS in the first multiple antenna mode and data signals for at least one MS in the second multiple antenna mode, and wherein the difference between Y and X transmit antennas (Y−X) comprising the antenna group B are utilized to send only data signals for at least one MS in the second multiple antenna mode.

26. The transmitter of claim 25, wherein the MS is determined to be serviced in the second multiple antenna mode according to at least one of the channel status, channel change, and velocity of the MS.

27. The transmitter of claim 25, wherein the channel estimator estimates an uplink channel using a sounding signal received from the MS, and acquires the downlink channel values by calibrating estimated uplink channel values.

28. The transmitter of claim 25, wherein the weight matrix is a codebook-based pre-coding matrix.

29. The transmitter of claim 25, wherein the weight matrix is a Singular Value Deposition (SVD)-based singular vector matrix.

30. The transmitter of claim 25, further comprising a plurality of Inverse Fast Fourier Transform (IFFT) processors for IFFT-processing a plurality of antenna signals received from the weight multiplier and transmitting IFFT signals through the Y transmit antennas.

* * * * *